(12) United States Patent
Warmerdam

(10) Patent No.: US 6,481,465 B1
(45) Date of Patent: Nov. 19, 2002

(54) COMPRESSED-RING PNEUMATIC PIPE PLUG

(76) Inventor: Gerard G. Warmerdam, 17400 N. Bowser Rd., Lodi, CA (US) 95240

( * ) Notice: Subject to any disclaimer, the term of this patent is extended or adjusted under 35 U.S.C. 154(b) by 0 days.

(21) Appl. No.: 09/767,274

(22) Filed: Jan. 23, 2001

(51) Int. Cl.$^7$ ................................................ F16L 55/12
(52) U.S. Cl. .......................................... 138/93; 138/89
(58) Field of Search ............................... 138/90, 93, 89

(56) References Cited

U.S. PATENT DOCUMENTS

| | | | | |
|---|---|---|---|---|
| 1,510,212 A | * | 9/1924 | Du Bois .................... | 138/89 |
| 3,080,269 A | * | 3/1963 | Pollock et al. ............ | 138/97 |
| 3,902,528 A | * | 9/1975 | Tartabini et al. .......... | 138/90 |
| 3,958,607 A | * | 5/1976 | Gray ........................ | 138/97 |
| 4,423,754 A | * | 1/1984 | Carter, Jr. ................ | 138/93 |
| 4,458,721 A | * | 7/1984 | Yie et al. .................. | 138/40 |
| 4,565,222 A | * | 7/1984 | Lundman .................. | 138/40 |
| 4,467,836 A | * | 8/1984 | Ragout ..................... | 138/93 |
| 4,614,206 A | * | 9/1986 | Mathison et al. .......... | 138/93 |
| 4,750,525 A | * | 6/1988 | Vaughan ................... | 138/89 |
| 4,790,356 A | * | 12/1988 | Tash ......................... | 138/93 |
| 5,353,842 A | * | 10/1994 | Lundman .................. | 138/93 |
| 5,358,012 A | * | 10/1994 | Kish ......................... | 138/109 |
| 5,901,752 A | * | 5/1999 | Lundman .................. | 138/93 |
| 6,116,286 A | * | 9/2000 | Hooper et al. ............ | 138/93 |

\* cited by examiner

Primary Examiner—James Hook
(74) Attorney, Agent, or Firm—Richard Esty Peterson, Patent Attorney

(57) ABSTRACT

A compressed-ring pneumatic pipe plug having an expandable bladder in the form of an annulus, the bladder having open ends with end cuffs and a pair of rigid end caps that are constructed with a circular end plate having a perimeter rim over which an end cuff is installed and with a ring that is installed over the end cuff and compressed against the cuff and rim, with the rim and ring having a complimentary ridge and groove arrangement to lock the ring onto the rim with the end cuff of the bladder sandwiched between the rim and ring.

1 Claim, 1 Drawing Sheet

COMPRESSED-RING PNEUMATIC PIPE PLUG

BACKGROUND OF THE INVENTION

This invention relates to a pneumatic pipe plug typically used to block or divert the flow in municipal or commercial pipe. A pneumatic pipe plug operates by inflating an expandable bladder which expands against the inside wall of the pipe. Typically, the pipe can range from inches to many feet in diameter. The pneumatic pip plug remains in place by the frictional forces generated between the expanded bladder and the inside wall of the pipe. As used herein, the term 'pipe plug' includes a flow diverter in which the normal flow of the fluid in the pipe is blocked and directed to a smaller flow through conduit and typically redirected to a recovery or disposal location through a connected hose.

In fabricating a pneumatic pipe plug the interconnection of the pneumatic bladder and the rigid end structure of the plug is problematic. Customarily, the expandable bladder is formed with an end that is custom formed and wrapped over and around rigid end plates which include anchor means to control the pipe plug and fittings to provide for supply of air or other gas to the pipe plug during inflation.

The pipe plug is typically used in an environment that is unpredictable and may be critical to the safety of workers, for example, in a municipal sewer pipe line that is blocked with a pipe plug to allow repair men to enter and repair a segment of pipe. In such environments, the pipe plug must be versatile, rugged and highly resistant to failure. In order to meet this challenge, conventional pneumatic pipe plugs are in part hand fabricated which adds substantially to the resultant cost. Problems in fabricating pipe plugs for larger diameter pipe are compounded by the aggregate forces applied to the plug from even moderate fluid pressures. In typical drainage pipe systems, the pipe plug must withstand a ten foot water head and similar pressures from fluids and other environments are expected to be encountered.

It is the object of this invention to construct production pneumatic pipe plugs that perform in the expected environment as well as hand crafted pneumatic pipe plugs. By elimination of the hand forming of the pneumatic bladder forming the body of the pipe plug, substantial savings in fabrication costs can be achieved.

SUMMARY OF THE INVENTION

The pneumatic pipe plug of this invention is designed to reduce the fabrication time and costs of producing a pneumatic pipe plug without compromising the versatility, durability and/or safety of the resultant plug. The compressed-ring pneumatic pipe plug of this invention has a body in the form of a pneumatic bladder with rigid end caps. The end caps are constructed with circular end plates with a rigid perimeter rim over which end cuffs of the pneumatic bladder are installed. A ring substantially matching the rim is positioned over the end cuffs and rim and compressed by high pressure swaging device. The end cuffs of the expandable bladder are thereby sandwiched between the peripheral contact surface of the rim and the inner contact surface of the ring. To prevent the forces of the expanding bladder from peeling the ring off from the rim, the outer contact surface of the rim is provided with a ridge and the inner contact surface of the ring is provided with a complimentary groove. It is to be understood that the opposite arrangement with a groove in the rim and a ridge in the ring provides an equivalent structure to lock the ring to the rim when the rim is compressed when swaging. Multiple grooves and ridges can be provided to accomplish this function.

The circular end plates can be fitted with or tapped for fittings according to the prospective usage of the plug.

DETAILED DESCRIPTION OF THE PREFERRED EMBODIMENT

Figure 1:
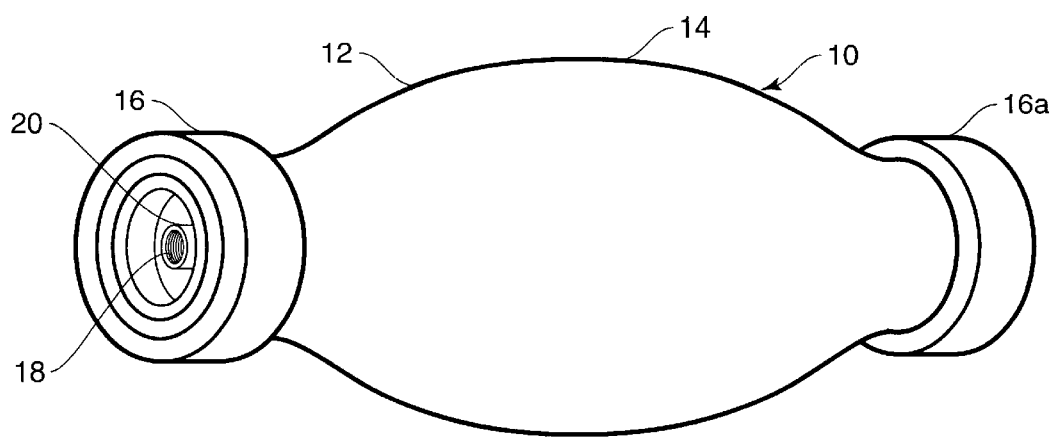
FIG. 1 is a perspective view of the compressed-ring pneumatic pipe plug of this invention.

Referring to FIG. 1, a compressed-ring pneumatic pipe plug of this invention is shown and designated generally by the reference numeral 10. The pipe plug 10 has a body 12 in the form of a pneumatic expandable bladder 14 that has a diameter and length suited to the general diameter of the conduit or pipe in which it is installed for operation. In addition, the pipe plug 10 has rigid end caps 16 and 17 which are in part designed to allow the pipe plug to be installed in smaller conduit than a comparative plug with the bladder wrapped over the end plate of the plug. At least one of the end caps 16 includes an aperture 18 allowing the pipe plug 10 to be connected to a source of pressurized gas, typically air. The aperture 18 of the pipe plug 10 of FIG. 1 is formed by a threaded pipe fitting 20.

Figure 2:
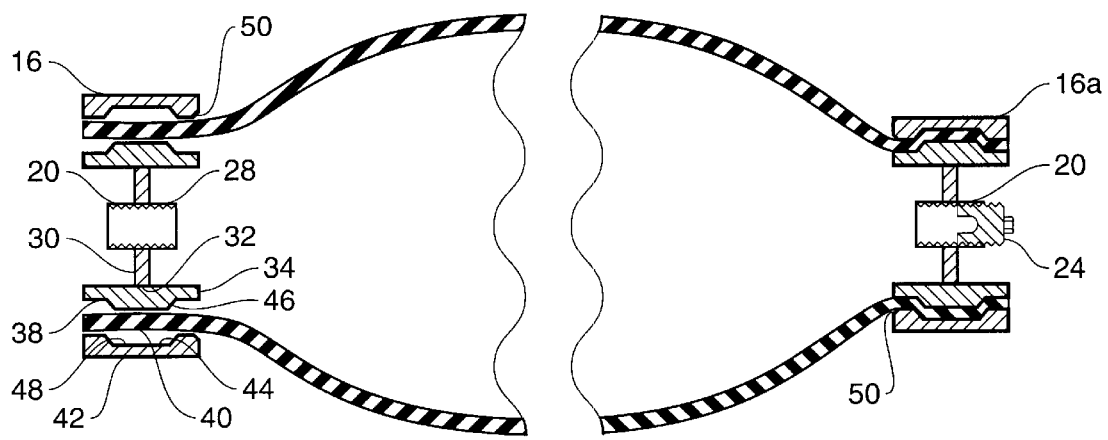
FIG. 2 is a cross-sectional view, partially broken-away showing the manner of fabricating the compressed-ring pneumatic pipe plug of FIG. 1.

Referring to the cross-sectional view of FIG. 2, the end caps 16 and 17 of the preferred embodiment are identical when formed and sealed as shown in FIG. 1. The fitting 20 of one end cap 17 includes a plug 24 to illustrate one simple plug configuration. The fitting 20 shown in the drawings is in the form of a pipe coupler 28. The diameter of the aperture can be varied in size and accomodate fittings of different size and type. For example, larger diameters may be used when the compressed-ring pipe plug is designed to function as a flow through plug and the fittings 20 couple to by-pass hoses. As shown, the fitting 20 is easily connectable to a adapter or fitting for a pressure hose for inflating the pipe plug and expanding the bladder 14 during operation of the device as a simple plug.

The rigid end caps 16 and 17 are each constructed with a circular end plate 30. The end plates 30 are of sufficient thickness to withstand deformity during swaging and permit the drilling and tapping of threaded holes or blind holes for fittings such as pressure hose fittings, eye bolt anchors for leash lines, or other similar items. Each end plate 30 has an outer perimeter 32 to which a rigid rim 34 is fixed. The rigid rim 36 has a peripheral contact surface 38 over which an end cuff 40, comprising the constricted end segment of the bladder 14, is installed. Over the end cuff 40 is installed an outer ring 42 shown in a slightly exaggerated diameter in the end cap 16 of FIG. 2. The outer ring 42 has an inner contact surface 44 that is engageable with the cuff 40 when the outer ring 42 is compressed against the cuff 40 and the rim 34.

The outer ring 42 is constructed of a ductile metal such as steel or aluminum and is compressed by the use of a high-pressure swaging machine. Because of the size of the diameter of end caps, the swaging machine must be capable of delivering pressures of many tons to compress the outer ring 42 firmly against the rim 34, with the end cuff 40 of the bladder 14 sandwiched therebetween.

The rim 34 includes a perimeter ridge 46 that is centrally located on the rim 34 and positioned opposite an internal perimeter groove 48 on the ring 42. When the ring 42 is compressed, the end cuff is firmly compressed between the ring 42 and the rim 34. The ridge 46 locks in the complimentary groove 48 preventing any slippage of the ring 42. The ridge and groove arrangement can be reversed, and the rim and ring can include multiple complimentary ridges and grooves. The ring 42 has a chamfered corner 50 to prevent cutting of the bladder which is usually rubber, when the bladder is expanded.

When uniformly distributed, the swaging machine delivers its radially directed forces on the ring with lesser forces directed to the rim during the last stages of compression of the ring onto the flexible cuff of the bladder. The circular plate maintains the integrity of the rim and must be sufficiently thick to withstand any uniformity variations in the compression operation. Typically, the width of the rim and the matching width of the ring are at least a magnitude greater than the thickness of the plate, and as shown, are multiple magnitudes wider. The thickness of the ring and rim are such to prevent any flexing or relaxing after the compression operation to prevent leakage of the bladder and failure of a plugging or bypass operation in the field.

The configuration and sizing of the inflatable compressed-ring pneumatic pipe plug is comparable to conventional pipe plug with an improved inflation capability and pressure capacity allowing use of the invented pipe plug in larger sized conduit and under greater water head or back pressure.

The description of the foregoing embodiment is made to disclose the unique feature of the invented pipe plug and is not intended to limit the scope of the invention to the embodiment show. It is to be understood that many modifications can be made to adapt the device to a particular application customery for a large diameter, pneumatic pipe plug of this type. The exposed end plates of the end caps alows the device to be equipped with the auxilliary fittings necessary to make the compressed-ring pneumatic pipe plug higly versitile and adaptable.

What is claimed is:

1. A compressed-ring pneumatic pipe plug comprising:
   a pneumatic expandable bladder in the form of an annulus, the bladder having opposite open ends with end cuffs, and,
   a pair of rigid end caps coupled to the opposite ends of the bladder, each end cap being constructed with a circular end plate with an outer perimeter and a rigid rim fixed to the perimeter of the end plate, the rim having a peripheral contact surface over which one of the end cuffs of the bladder is installed, and an outer compressible swaging ring installed over the end cuff and rim, the ring being formed of a ductile metal and uniformly compressed against the rim by swaging with the end cuff sandwiched between the rim and ring, wherein the end plates have a thickness and the rim and ring have a width wherein the width of the rim is at least one magnitude greater than the thickness of the plate and the width of the ring is substantially equal to the width of the rim, and wherein at least one end plate has an aperture adapted to connect to a pressurized air source wherein each ring has an inner contact surface engaging the end cuff of the bladder and one of the inner contact surface of the ring and the peripheral contact surface of the rim has a ridge and the other of the inner contact surface of the ring and the peripheral contact surface of the rim has a groove oppositely positioned from the ridge wherein the circular end plates are fixed to the rims substantially at the middle of the width of each rim.

* * * * *